United States Patent Office 3,249,563

Patented May 3, 1966

3,249,563

POLYURETHANE-POLYAMIDE SOLDERING COMPOSITION

Albert C. Balk, Detroit, Mich., assignor to General Motors Corporation, Detroit, Mich., a corporation of Delaware No Drawing. Filed July 10, 1961, Ser. No. 122,651
4 Claims. (Cl. 260—22)

This invention relates to solders and more particularly to the preparation of thermoplastic compositions suitable for use as solid solders. More specifically, this invention relates to solders including a mixture of a thermoplastic polyamide and a thermoplastic polyurethane resin.

Metal surfaces of automobile bodies, household appliances and the like having dents, cracks or holes are coated and filled with various types of solders in order to eliminate these imperfections. A satisfactory elimination of such imperfections involves subjecting the filled surfaces to a finishing operation in order to obtain a smooth and uniformly glossy surface which blends with the metal surface and does not peel or flake Since this subsequent finishing operation is costly and time consuming, the provision of a solder which minimizes the finishing operation is of great importance. Moreover, the use of lead solders on the production line involves a health hazard due to the toxicity of lead.

It is the object of this invention to eliminate the need for lead solders on the automotive production line and to provide a thermoplastic resin composition which is a practical substitute for conventional lead body solders usable at relatively low temperatures in the vicinity of 250° F. to 400° F. A further object of this invention is to provide an external body solder in which thermoplastic resins form the thermoplastic portions thereof and which may be readily applied to the body which is being repaired; which has good adhesion to metal and resistance to impact over a wide temperature range; which is readily compatible with surface preparation chemicals, primers, lacquers and heat cycles required in their application; and which is readily susceptible to mechanical finishing procedures, particularly in having good workability in the sense of being readily sanded, and good featherability, i.e., its ability to blend in with the adjacent metal surfaces.

These and other objects are accomplished by providing a composition which consists of major proportions of a filler such as atomized aluminum powder or finely divided silica flour and minor proportions of a mixture of a thermoplastic polyamide which is a condensation product of a polyamine such as ethylene diamine and an unsaturated fatty acid such as linoleic acid and a thermoplastic polyuretahne which is the reaction product of a linear polyester and a polyisocyanate.

Other objects and advantages of the invention will be apparent from the following detailed description of the invention.

The solder of this invention involves properties which make it an excellent substitute for conventional lead body solders typically used to patch up holes, cracks and other imperfections in automobile bodies and in several ways represents an improvement thereover. As indicated above, the essential properties of the solder of this invention include workability at relatively low temperatures in the vicinity of 250° F. to 400° F. This means that portions of a painted car body panel may be repaired without subjecting a large portion thereof to heat which will adversely affect the paint finish. The solder has excellent workability in that on application the surfaces thereof finish smoothly in response to grinding and sanding operations.

The solder of this invention consists of a combination of materials which produce the objects and advantages described above. In general, the solder consists of a homogeneous mixture of a thermoplastic polyurethane plastic which is the reaction product of an organic diisocyanate and a polyester derived from a dibasic aliphatic acid and an alkyl glycol, a thermoplastic polyamide resin which is a condensation product of a polyamine and a dibasic acid obtained by polymerizing unsaturated fatty acids, and a finely divided filler.

A specific example of a solder prepared in accordance with this invention is a homogeneous mixture consisting of, by weight, 20 parts of the thermoplastic polyurethane resin, 5 parts of the thermoplastic polyamide resin and 75 parts of a filler. The polyurethane plastic is the principal thermoplastic substance of the solder composition and has a melting temperature in the range of about 220° F. to 375° F. It is the reaction product of one equivalent of a polyester formed by reacting one mole of adipic acid with about 1.3 moles of ethylene glycol to form a polyester having an acid number of less than 10 and about 1.2 equivalents of 4,4'-diphenyl methane diisocyanate. The polyamide is the reaction product of ethylene diamine and dilinoleic acid having a molecular weight in the range of 6000 to 9000, a melting point of about 220° F. to 375° F. and an amine number of less than 10. The filler is a silica flour which will pass through a 200 mesh screen. In the above example of a preferred solder composition the resin portion consists of 80% by weight of the polyurethane component and 20% by weight of the polyamide component. The resin portion constitutes 25% by weight of the solder and 75% by weight of the filler. Satisfactory solders may be obtained with a variation of the filler in the range of about 70% to 80% by weight. Solder compositions containing below 70% have metal finishing difficulties. In the resin portion of the solder satisfactory results are obtained with a variation of about 5% to 40% by weight of the polyamide component with the remaining portion of the resin component consisting of the polyurethane component.

Both the polyamide and polyurethane constituents are essential in the solder composition. The polyurethane constituent improves impact resistance and reduces brittleness. The polyamide constituent improves adhesion of the mixture to the metal, maintains the melting point of the mixture at about 285° F. to 330° F., controls the flow of the mixture at elevated temperatures, and functions to prevent mud-type cracking in the primer and the surface finish.

These ingredients are preferably compounded on a hot two roll rubber mill in a conventional manner to produce a tough, board-like slab. In the application thereof to a steel panel, the portion of the panel having the depression which it is desired to fill is preheated to 400° F. to 450° F. by means of a gas torch. A portion of the organic solder compound is transferred to the heated depression whereupon the solder compound melts at the surface of the steel sheet. On continuing to play the torch lightly over the compound, the compound assumes a state of moldable consistency. In this state the temperature of the compound is between about 325° F. and 375° F. It may be readily leveled with a polished cold metal roller so as to fill in and smooth over the depression. The filled surface is then finished by a typical car body panel production finishing procedure in which the surfaces may be bonderized, coated with a primer surfacer, baked 45 minutes at a temperature of about 300° F. and then finished with an acrylic lacquer.

Another illustration of a solder composition in accordance with the invention involves the preparation of a mixture consisting, by weight, of 19 parts of a thermoplastic polyether-polyurethane plastic, one part of the polyamide resin described above and 80 parts of atomized aluminum powder. The polyether-polyurethane plastic was prepared by first reacting one mole of ethylene oxide with small amounts of ethylene glycol in the presence of boron fluoride as a catalyst to produce a polyether glycol having a hydroxyl number in the range of 50 to 200. The polyether glycol is then reacted with a molecular excess of 4,4'-diphenyl methane diisocyanate to form the polyurethane portion of the solder. These materials are compounded on a hot rubber mill, the material being maintained at about 200° F. to 250° F. to facilitate handling and application. A quantity of the softened compound was transferred to a preheated depression of a steel panel. Additional heat was then applied to the solder to obtain a desirable moldable consistency. The softened solder was then forced into the depression and compacted by a roller. The filled surface of the test panel withstood more than 10 foot-pounds of falling ball impact at room temperatures and 6 foot-pounds of falling ball impact at −20° F. In this composition the filler constitutes 80% by weight of the solder and the polyamide portion of the resin component constitutes 5% by weight thereof. The 70% to 80% by weight range of the filler is preferred when fillers such as powdered aluminum and silica are used. When using fillers having a substantially greater density, the filler content on a weight basis may be raised accordingly to maintain a similar filler volume relationship.

Satisfactory polyesters for use in the preparation of the polyester-polyurethane plastic may be formed by using any dibasic aliphatic acid of the formula $$HOOC(CH_2)_nCOOH$$

where the $n$ is in the range of 2 to 10 as well as aromatic dicarboxylic acids such as phthalic, isophthalic, terephthalic acids and mixtures of these aromatic and aliphatic acids. Suitable polyesters may likewise be prepared from reactants in which the ethylene glycol is replaced by any glycol of the formula $HO(CH_2)_nOH$ where $n$ is within the range of 3 to 8. In this formula the $(CH_2)_n$ group may be replaced by cyclohexane or benzyl groups. Mixtures of these compounds may be used. The 4,4'-diphenyl methane diisocyanate may be replaced by toluene diisocyanate, naphthalene 1,5-diisocyanate, bitolyl diisocyanate, dimethyl diphenyl methane diisocyanate, and dianisidine diisocyanate.

In the preparation of the polyether glycol for the polyurethane portion of the solder, ethylene oxide is reacted with the diisocyanate. Various other oxides including propylene oxide, butylene oxide, tetrahydrofuran or mixtures of these oxides may be used in the preparation of the polyether glycol used as a precursor in the preparation of the polyurethane plastic portion of the solder.

As previously indicated, the polyamide involved in the solder of this invention is a condensation product of a polyamine such as ethylene diamine and a dibasic acid obtained when unsaturated fatty acids such as linoleic acids are dimerized. Other diamines such as hexamethylene diamine may be used as well as other dimerized unsaturated fatty acids. The essential properties of a suitable polyamide in this invention are a molecular weight in the range of 6000 to 9000, a melting point in the range of 220° F. to 375° F. and an amine number of less than 10.

Other fillers as, for example, graphite and flake glass may be satisfactorily used in this invention. The atomized aluminum powder is particularly advantageous in that it confers conductivity on the solder which permits rapid softening of the organic solder, imparts heat and flame resistance to the composition and improves resistance to penetration by solvents.

Although the invention has been described in terms of certain preferred embodiments, it will be understood that the invention is not limited thereby and changes and modifications will be apparent to those skilled in the art without departing from the spirit and principles of the invention.

I claim:

1. A thermoplastic body solder adapted to be applied to holes, cracks and similar imperfections of automobile bodies or the like by the application of heat and mechanical forming consisting of major proportions of an inorganic filler and minor proportions of a thermoplastic resinous binder, said binder consisting of about 5% to 40% by weight of a thermoplastic polyamide resin and the balance substantially a thermoplastic polyurethane resin having a melting point in the range of about 220° F. to 375° F., said polyamide resin being the reaction product of an alkylene diamine and a dimerized unsaturated fatty acid having a molecular weight in the range of about 6000 to 9000, a melting point within the range of about 220° F. to 375° F. and an amine number of less than 10.

2. A thermoplastic body solder adapted to be applied to holes, cracks and similar imperfections of automobile bodies or the like by the application of heat and mechanical forming consisting of about 70% to 80% by weight of an aluminum powder and the balance substantially a thermoplastic resinous binder, said binder consisting of about 5% to 40% by weight of a thermoplastic polyamide resin and the balance substantially a thermoplastic polyurethane resin, said polyamide resin being the reaction product of an alkylene diamine and dilinoleic acid having a molecular weight in the range of about 6000 to 9000, a melting point within the range of about 220° F. to 375° F. and an amine number of less than 10, said polyurethane being formed from a polyester which is the reaction product of an alkylene glycol having 2 to 4 carbon atoms and a dibasic aliphatic acid having 2 to 8 ethylene groups, and an organic diisocyanate.

3. A thermoplastic body solder adapted to be applied to holes, cracks and similar imperfections of automobile bodies or the like by the application of heat and mechanical forming consisting of about 70% to 80% by weight of a silica filler and the balance a thermoplastic resinous binder, said binder consisting of about 5% to 40% by weight of a thermoplastic polyamide resin and the balance substantially a thermoplastic polyurethane resin, said polyamide resin being the reaction product of an alkylene diamine and dilinoleic acid having a molecular weight in the range of about 6000 to 9000, a melting point within the range of about 220° F. to 375° F. and an amine number of less than 10, said polyurethane being derived from a polyalkylene glycol having a hydroxyl number of about 50 to 200, and an organic diisocyanate.

4. A thermoplastic body solder adapted to be applied to holes, cracks and similar imperfections of automobile bodies or the like by the application of heat and mechanical forming consisting of about 70% to 80% by weight of a powdered aluminum filler and the balance substantially of a thermoplastic resinous binder, said binder consisting of about 5% to 40% by weight of a thermoplastic polyamide resin and the balance substantially a polyurethane resin, said polyamide resin being the reaction product of an alkylene diamine and dilinoleic acid having a molecular weight in the range of about 6000 to 9000, a melting point within the range of about 220° F. to 375° F. and an amine number of less than 10, said polyurethane having a melting temperature within the range of 220° F. to 375° F.

(References on following page)

References Cited by the Examiner

UNITED STATES PATENTS

| | | | |
|---|---|---|---|
| 2,379,413 | 7/1945 | Bradley | 260—18 X |
| 2,663,649 | 12/1953 | Winkler | 260—18 |
| 2,769,826 | 11/1956 | Yoho | 260—18 X |
| 2,844,554 | 7/1958 | Nichols et al. | 260—22 X |
| 2,864,780 | 12/1958 | Katz et al. | 260—18 |
| 2,871,218 | 1/1959 | Schollenberger | 260—858 |
| 2,944,036 | 7/1960 | Floyd et al. | 260—18 |
| 3,015,650 | 1/1962 | Schollenberger | 260—858 X |

LEON J. BERCOVITZ, *Primary Examiner.*

MILTON STERMAN, *Examiner.*